(12) United States Patent
Yang

(10) Patent No.: US 10,875,215 B2
(45) Date of Patent: Dec. 29, 2020

(54) THREE DIMENSIONAL PRINTING METHOD AND THREE DIMENSIONAL PRINTING APPARATUS USING THE SAME

(71) Applicants: XYZprinting, Inc., New Taipei (TW); Kinpo Electronics, Inc., New Taipei (TW)

(72) Inventor: Yu-Jie Yang, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 249 days.

(21) Appl. No.: 15/943,719

(22) Filed: Apr. 3, 2018

(65) Prior Publication Data

US 2019/0091897 A1 Mar. 28, 2019

(30) Foreign Application Priority Data

Sep. 28, 2017 (CN) .......................... 2017 1 0894333

(51) Int. Cl.
*B29C 35/02* (2006.01)
*B29C 64/118* (2017.01)
(Continued)

(52) U.S. Cl.
CPC ........ *B29C 35/0288* (2013.01); *B29C 64/118* (2017.08); *B29C 64/393* (2017.08);
(Continued)

(58) Field of Classification Search
None
See application file for complete search history.

(56) References Cited

U.S. PATENT DOCUMENTS

| 5,776,409 A | 7/1998 | Almquist et al. |
| 2014/0271964 A1 | 9/2014 | Roberts, IV et al. |

(Continued)

FOREIGN PATENT DOCUMENTS

| CN | 103838202 | 6/2014 |
| CN | 106273441 | 1/2017 |

(Continued)

OTHER PUBLICATIONS

"Search Report of Europe Counterpart Application", dated Nov. 9, 2018, p. 1-p. 7.
(Continued)

*Primary Examiner* — Matthew J Daniels
*Assistant Examiner* — Paul Spiel
(74) *Attorney, Agent, or Firm* — JCIPRNET

(57) ABSTRACT

The disclosure provides a 3D printing method and a 3D printing apparatus using the same. The 3D printing method includes the following steps: feeding a material using a printing parameter, wherein the printing parameter includes a target temperature and a target feeding rate; adjusting the printing parameter to change the heat energy provided to the printing filament per unit length; determining whether the target feeding rate matches the actual feeding rate according to the adjusted printing parameter to obtain a determination result; obtaining a correspondence relationship between the plurality of target temperatures and the plurality of target feeding rates according to the adjusted printing parameters and the determination results; and setting the printing parameter to print according to the obtained correspondence relationship.

24 Claims, 3 Drawing Sheets

(51) Int. Cl.
  *B29C 64/393*  (2017.01)
  *B33Y 30/00*  (2015.01)
  *B33Y 50/02*  (2015.01)
  *B33Y 10/00*  (2015.01)

(52) U.S. Cl.
  CPC .............. *B33Y 10/00* (2014.12); *B33Y 30/00* (2014.12); *B33Y 50/02* (2014.12)

(56) References Cited

U.S. PATENT DOCUMENTS

| | | |
|---|---|---|
| 2015/0097307 A1* | 4/2015 | Batchelder ............ B29B 13/022 264/40.6 |
| 2016/0179064 A1 | 6/2016 | Arthur et al. |
| 2016/0200024 A1 | 7/2016 | Kim et al. |
| 2017/0050374 A1 | 2/2017 | Minardi et al. |

FOREIGN PATENT DOCUMENTS

| | | |
|---|---|---|
| CN | 106584838 | 4/2017 |
| CN | 105216273 | 1/2018 |
| EP | 3095594 | 11/2016 |
| JP | 2016107462 | 6/2016 |
| WO | 2017222600 | 12/2017 |

OTHER PUBLICATIONS

"Office Action of Japan Counterpart Application", dated Jun. 25, 2019, p. 1-p. 4.

* cited by examiner

THREE DIMENSIONAL PRINTING METHOD AND THREE DIMENSIONAL PRINTING APPARATUS USING THE SAME

CROSS-REFERENCE TO RELATED APPLICATION

This application claims the priority benefit of China application serial no. 201710894333.7, filed on Sep. 28, 2017. The entirety of the above-mentioned patent application is hereby incorporated by reference herein and made a part of this specification.

BACKGROUND

Technical Field

The disclosure is related to a printing method and a printing apparatus, and particularly to a three dimensional (3D) printing method and a 3D printing apparatus using the same.

Description of Related Art

Most current 3D printing machines are provided with exclusive printing filaments. Manufacturers perform tests on the exclusive filaments in advance to determine parameters for printing such as a printing temperature (e.g., heating temperature of printing head) or a feeding rate suitable for each exclusive printing filament. However, due to the inherent characteristics of the materials, the characteristics of the filaments are likely to change along with storage time; accordingly, the printing parameters acquired from the tests performed by the manufacturers are no longer the optimal printing parameters suitable for actual printing operations performed by users.

Apart from time, the environment where the 3D printing machine is used also affects the optimal printing parameters. For example, since the printing filaments get cooled at different rates when the same 3D printing machine and printing filament are used in different areas where the weather is hot or cold, the optimal printing temperatures or feeding rate are not the same. Moreover, when the user does not use the printing filaments of which the printing parameters are already known in advance, it is likely that the quality of printing decreases significantly due to improper printing temperature. If the printing temperature in using is too high, the problem is that the material is likely to drip or hang down; if the printing temperature in using is too low, the problem is that the material cannot be fed smoothly or is likely to be jammed.

Accordingly, in the technical field of 3D printing, if there is a method which is capable of determining the most suitable printing parameters when in use, using the printing parameters determined by such method may bring significant improvement for the quality of printing.

SUMMARY

The disclosure is related to a three dimensional (3D) printing method and a 3D printing apparatus using the method, which are capable of determine better 3D printing parameters for printing, adaptable for any printable filaments and also improve quality of printing.

According to an embodiment of the disclosure, a 3D printing method for a 3D printing apparatus includes the following steps: feeding material with a printing parameter, wherein the printing parameter includes a target temperature and a target feeding rate; adjusting the printing parameter to change heat energy provided to a printing filament per unit length; determining whether a target feeding rate matches an actual feeding rate according to the adjusted printing parameter to obtain a determination result; obtaining a correspondence relationship between a plurality of target temperatures and a plurality of target feeding rates according to the adjusted printing parameters and the determination results; and setting the printing parameter for printing according to the obtained correspondence relationship.

According to an embodiment of the disclosure, a 3D printing apparatus includes a feeder element and a controller. The feeder element provides heat energy to the printing filament and feeds material. The controller is coupled to the feeder element to set the printing parameter to control the feeder element to feed material according to the set printing parameter, wherein the printing parameter include a target temperature and a target feeding rate. The controller adjusts the printing parameter to change the heat energy that the feeder element provides to the printing filament per unit length, and determines whether the target feeding rate matches the actual feeding rate of the feeder element according to the adjusted printing parameter to obtain the determination result. In addition, the controller obtains a correspondence relationship between a plurality of the target temperatures and a plurality of the target feeding rates according to the adjusted printing parameters and the determination results, and sets the printing parameter to print according to the acquired correspondence relationship.

In summary, the 3D printing method and the 3D printing apparatus in the embodiments of the disclosure are capable of performing tests in advance by feeding materials before actual printing so as to acquire the correspondence relationship between the target temperature and the target feeding rate required for the printing filament in use to feed material smoothly in current environment, and performing printing using the obtained correspondence relationship. In this manner, no matter which kind of filament is used when printing an object, a good printing quality can be obtained.

In order to make the aforementioned features and advantages of the disclosure more comprehensible, embodiments accompanying figures are described in detail below.

BRIEF DESCRIPTION OF THE DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DESCRIPTION OF EMBODIMENTS

Figure 1:
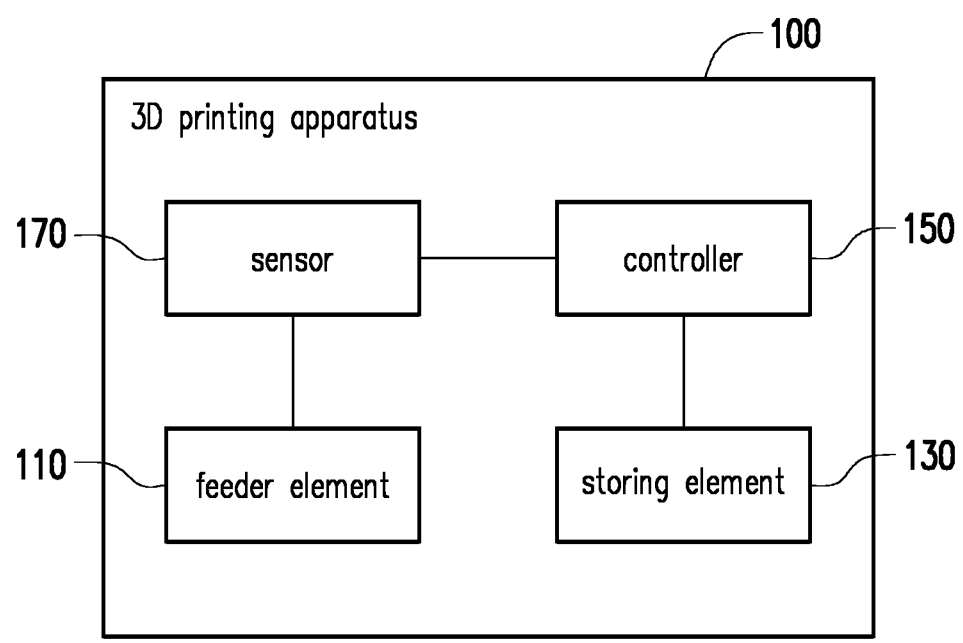
FIG. 1 is a schematic block view of a 3D printing apparatus according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic block view of a 3D printing apparatus according to an embodiment of the disclosure.

Referring to FIG. 1, in the embodiment, a 3D printing apparatus 100 includes a feeder element 110, a storing element 130, a controller 150 and at least one sensor 170, wherein the controller 150 is coupled to the feeder element 110, the storing element 130 and at least one sensor 170, and each of the sensors 170 is coupled to the feeder element 110.

In the embodiment, the feeder element 110 includes, for example, a power source (e.g., motor), at least one transporting wheel and a printing head. Specifically, when feeding materials, the feeder element 110, for example, uses the power source and the at least one transporting wheel to transport the printing filament to the printing head, and the printing head performs heating to the printing filament and emits the molten printing filament from the printing head to complete the feeding action.

The storing element 130 is, for example, any type of a fixed or movable random access memory (RAM), a read-only memory (ROM), a flash memory or other similar elements or a combination thereof. In an embodiment, the storing element 130 may be used record any form of required data in the database; the disclosure provides no limitation thereto.

The controller 150 is, for example, a central processing unit (CPU), or a programmable microprocessor for a general purpose or a specific purpose, a digital signal processor (DSP), a programmable controller, an application specific integrated circuit (ASIC), a programmable logic device (PLD) or other similar devices or a combination of thereof.

In the embodiment, the controller 150 sets the printing parameter including the target temperature and the target feeding rate so as to control the feeder element 110 to feed material according to the printing parameter which has been set. For example, after the controller 150 sets the printing parameter, the feeder element 110, for example, heats the printing head according to the target temperature of the printing parameter, and controls the rotating rate of the motor according to the target feeding rate to change the transporting rate of the printing filament.

In the embodiment, at least one sensor 170 generates a sensing signal such that the controller 150 can determine whether the set target feeding rate matches the actual feeding rate of the feeder element 110 according to the sensing signal. However, the disclosure provides no limitation to the type, configuration and position of the at least one sensor 170.

In an embodiment, the at least one sensor 170 is, for example, an encoder disk sensor that is used for detecting rotating rate, which is coupled to at least one transporting wheel of the feeder element 110 to detect the rotating rate of the at least one transporting wheel to acquire the sensing signal of the rotating rate. Therefore, the controller 150 may, for example, calculate the actual rate at which the material is fed directly according to the sensing signal of the rotating rate, and determine whether a difference between the actual rate and the target feeding rate is larger than a predetermined threshold. If so, it represents that the target feeding rate does not match the actual feeding rate; if not, it represents that the target feeding rate matches the actual feeding rate.

In an embodiment, the at least one sensor 170 is, for example, directly coupled to the power source (e.g., motor) of the feeder element 110 to sense whether the rotating rate of the power source or the transporting rate is changed. Therefore, when the target feeding rate matches the actual feeding rate, the power source is operated continuously at the same rotating rate or the transporting rate. At this time, the sensing signal sensed by the sensor 170 is not changed. However, when the target feeding rate does not match the actual feeding rate, it is likely that the material is jammed, and the operating state of the power source is going to change; meanwhile, the sensing signal is going to change as well. In this manner, when the controller 150 detects that the sensing signal from the at least one sensor 170 is changed, it can be determined that the target feeding rate does not match the actual feeding rate.

In other words, the disclosure not only provides no limitation to the at least one sensor 170, but also provides no limitation to the specific embodiment when it is determined that the target feeding rate does not match the actual feeding rate. As long as it can be determined whether the material is jammed or not or whether there is any expected or unexpected feeding error, persons skilled in the art can perform implementation based on related knowledge. Therefore, no further descriptions are incorporated herein.

The controller 150 of the 3D printing apparatus 100, for example, reads a printing file to control the position of the printing head of the feeder element 110 to print the 3D object. In the embodiment, the 3D printing method used by the 3D printing apparatus 100 further has a correcting function which is capable of performing test to the printing filament first before printing the 3D object so as to determine the 3D printing parameter used for printing the 3D object.

Figure 2:
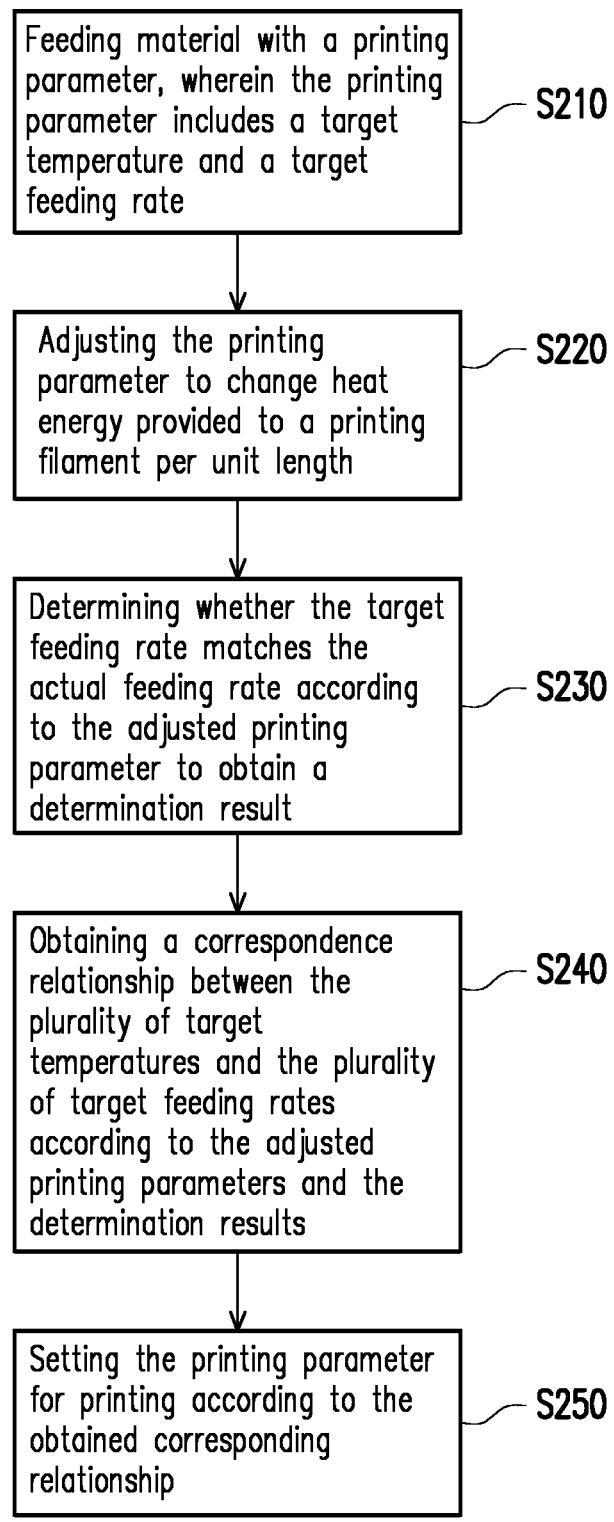
FIG. 2 is a flowchart of a 3D printing method according to an embodiment of the disclosure.

FIG. 2 is a flowchart of a 3D printing method according to an embodiment of the disclosure.

Referring to FIG. 2, the controller 150 sets the printing parameter first to control the feeder element 110 to feed material (S210) and adjusts the printing parameter while the material is fed to change the heat energy provided to the printing filament per unit length (S220). Subsequently, the controller 150 determines whether the target feeding rate matches the actual feeding rate according to the adjusted printing parameter to obtain a determination result (S230). The controller 150 may obtain the correspondence relationship between a plurality of the target temperatures and a plurality of target feeding rates according to the adjusted printing parameters and the determination results (S240).

Fix Target Temperature

In an embodiment, when the feeder element 110 feeds material, the controller 150 fixes the target temperature and changes the target feeding rate so as to change the heat energy provided to the printing filament per unit length. More specifically, when the target feeding rate is changed, the time for which that the printing filament per unit length is heated by the printing head is also changed, thereby changing the heat energy provided to the printing filament per unit length.

For example, the controller 150 sets the target temperature (e.g., temperature of printing head) to be fixed at 210° C., and sets that the target feeding rate to be 3 mm/sec to feed a specific length (e.g., 10 cm) of the material. During the feeding process, the controller 150 determines whether the target feeding rate (i.e., 3 mm/sec) matches the actual feeding rate according to the sensing signal of the sensor 170. If so, the controller 150 fixes the target temperature to be 210° C., increases the target feeding rate to be 4 mm/sec by adding a predetermined value (e.g., 1 mm/sec), and the material is fed for a specific length (e.g., also 10 cm). Similarly, in the feed process, the controller 150 determines whether the target feeding rate (i.e., 4 mm/sec) matches the actual feeding rate according to the sensing signal of the sensor 170. In this manner, the process is performed similarly until the controller 150 determines that the target feeding rate does not match the actual feeding rate.

If the controller 150 determines that the target feeding rate (e.g., 6 mm/sec) does not match the actual feeding rate, it means that the target feeding rate exceeds a critical value at the fixed target temperature (e.g., 210° C.). Therefore, the controller 150 records that, under the condition that the target temperature is fixed at 210° C., the highest target feeding rate that matches the actual feeding rate is 5 mm/sec. In an embodiment, the controller 150 records in the storing element 130 that, under the condition that the target temperature is 210° C., the corresponding target feeding rate is 5 mm/sec.

Similarly, the controller 150 fixes the target temperature (e.g., temperature of printing head) to be 220° C., and sets the target feeding rate to be 5 mm/sec and the material is fed for 10 cm. In the feeding process, the controller 150 determines whether the target feeding rate (i.e., 5 mm/sec) matches the actual feeding rate according to the sensing signal of the sensor 170. If so, the controller 150 fixes the target temperature to be 220° C., increases the target feeding rate to be 6 mm/sec by adding a predetermined value (e.g., 1 mm/sec) and also feeds the material for 10 cm. Similarly, in the feeding process, the controller 150 determines whether the target feeding rate (i.e., 6 mm/sec) matches the actual feeding rate according to the sensing signal of the sensor 170. In this manner, the process is performed similarly until the controller 150 determines that the target feeding rate does not match the actual feeding rate.

If the controller 150 determines that the target feeding rate (e.g., 9 mm/sec) does not match the actual feeding rate, it represents that the target feeding rate exceeds a critical value under the fixed target temperature (e.g., 220° C.). Therefore, the controller 150 records that, under the condition that the target temperature is fixed at 220° C., the highest target feeding rate that matches the actual feeding rate is 8 mm/sec. In an embodiment, the controller 150 records in the storing element 130 that, under the condition that target temperate is 220° C., the corresponding target feeding rate is 8 mm/sec.

In an embodiment, the controller 150 may further fix the target temperature (e.g., temperature of printing head) to be 200° C., set the target feeding rate to be 1 mm/sec and the material is fed for 10 cm. In the feeding process, the controller 150 determines whether the target feeding rate (i.e., 1 mm/sec) matches the actual feeding rate according to the sensing signal of the sensor 170. If so, the controller 150 fixes the target temperature to be 200° C., increases the target feeding rate to be 2 mm/sec by adding a predetermined value (e.g., 1 mm/sec), and also feeds the material for 10 cm. Similarly, in the feeding process, the controller 150 determines whether the target feeding rate (i.e., 2 mm/sec) matches the actual feeding rate according to the sensing signal of the sensor 170. In this manner, the process is performed similarly until the controller 150 determines that the target feeding rate does not match the actual feeding rate.

If the controller 150 determines that the target feeding rate (e.g., 3 mm/sec) does not match the actual feeding rate, it represents that the target feeding rate exceeds a critical value under the fixed target temperature (e.g., 200° C.). Therefore, the controller 150 records that, under the condition that the target temperature is fixed to be 200° C., the highest target feeding rate that matches the actual feeding rate is 2 mm/sec. In an embodiment, the controller 150 records in the storing element 130 that, under the condition that the target temperature is 200° C., the corresponding target feeding rate is 2 mm/sec.

According to the method described above, the controller 150 can obtain a plurality of target feeding rates corresponding to a plurality of target temperatures. It is noted that, the controller 150 not only records the correspondence relationship between the plurality of target temperatures and the plurality of target feeding rates in the storing element 130, but also records the printing filament that establishes the correspondence relationship in the storing element 130. Moreover, by using the above-mentioned method in a similar manner, the controller 150 may further use another kind of printing filament to find out another set of correspondence relationship between the plurality of target temperatures and the plurality of target feeding rates, and also records the correspondence relationship as well as the printing filament that establishes the correspondence relationship in the storing element 130.

Therefore, in an embodiment, the storing element 130 records a plurality of printing filaments and the correspondence relationships between the plurality of target temperatures and the plurality of target feeding rates each corresponds to one of the recorded printing filaments. With such design, in actual operation of printing an object, different correspondence relationships can be loaded according to different printing filaments so as to set the printing parameter for printing.

Fix Target Feeding Rate

In the above-mentioned embodiment, the controller 150 fixes the target temperature and changes target feeding rate so as to change the heat energy provided to the printing filament per unit length. In another embodiment, the controller 150 fixes the target feeding rate and changes the target temperature so as to change the heat energy provided to the printing filament per unit length. More specifically, when the target temperature is changed, the printing head uses higher energy to heat the printing filament so as to change the heat energy provided to the printing filament per unit length.

For example, the controller 150 fixes the target feeding rate to be 5 mm/sec and sets the target temperature to be a high temperature of 250° C. at which the material begins to be fed continuously, and decreases the target temperature during the feeding process. In the feeding process, the controller 150 determines whether the target feeding rate (i.e., 5 mm/sec) matches the actual feeding rate according to the sensing signal of the sensor 170. If so, the controller 150 continues to decrease the target temperature until the controller 150 detects that the target feeding rate does not match the actual feeding rate.

If the controller 150 detects that the target feeding rate does not match the actual feeding rate in the condition where the target temperate is 210° C., it means that, under the condition where the target feeding rate is 5 mm/sec, the lowest target temperature is also about (or slightly higher than) 210° C. when the target feeding rate and matches the actual feeding rate. Therefore, the controller 150 records that, when the target feeding rate is fixed to be 5 mm/sec, the lowest target temperature that allows the target feeding rate to match the actual feeding rate is 210° C. In an embodiment, the controller 150 records in the storing element 130 that, when the target feeding rate is 5 min/sec, the corresponding target temperate is 210° C.

Similarly, the controller 150 fixes the target feeding rate to be 8 mm/sec and sets the target temperature to be a high temperature of 250° C. at which the material beings to be continuously fed, and decreases the target temperature during the feeding process. In the feeding process, the controller 150 determines whether the target feeding rate (i.e., 8 mm/sec) matches the actual feeding rate according to the sensing signal of the sensor 170. If so, the controller 150 continues to decrease the target temperature until the controller 150 detects that the target feeding rate does not match the actual feeding rate.

If the controller 150 detects that the target feeding rate does not match the actual feeding rate at the temperature of 220° C., it means that, under the condition where the target feeding rate is 8 mm/sec, the lowest temperature is also about (or slightly higher than) 220° C. when the target feeding rate matches the actual feeding rate. Therefore, the controller 150 records that, when the target feeding rate is fixed to be 8 mm/sec, the lowest target temperature that allows the target feeding rate to match the actual feeding rate is 220° C. In an embodiment, the controller 150 records in the storing element 130 that, when the target feeding rate is 8 mm/sec, the corresponding target temperature is 220° C.

In an embodiment, the controller 150 may further fix the target feeding rate to be 2 mm/sec and, for example, set the target temperature to be a target temperature (e.g., 210° C.) corresponding to a higher target feeding rate (e.g., 5 mm/sec) at which the material begins to be fed continuously, and decreases the target temperature during the feeding process. In the feeding process, the controller 150 determines whether the target feeding rate (i.e., 2 mm/sec) matches the actual feeding rate according to the sensing signal of the sensor 170. If so, the controller 150 continues to decrease the target temperature until the controller 150 detects that the target feeding rate does not match the actual feeding rate.

If the controller 150 detects that the target feeding rate does not match the actual feeding rate at the target temperature of 200° C., it represents that, when the target feeding rate is 2 mm/sec, the lowest target temperature is also about (or slightly higher than) 220° C. when the target feeding rate matches the actual feeding rate. Therefore, the controller 150 records that, when the target feeding rate is fixed to be 2 mm/sec, the lowest target temperature that allows the target feeding rate to match the actual feeding rate is 200° C. In an embodiment, the controller 150 records in the storing element 130 that, when the target feeding rate is 2 mm/sec, the corresponding target temperature is 200° C.

According to the method described above, the controller 150 can obtain a plurality of target feeding rates corresponding to a plurality of target temperatures. It is noted that, the controller 150 not only records the correspondence relationship between the plurality of target temperatures and the plurality of target feeding rates in the storing element 130, but also records the printing filament that establishes the correspondence relationship in the storing element 130. Moreover, by using the above-mentioned method in a similar manner, the controller 150 may further use another kind of printing filament to find out another set of correspondence relationship between the plurality of target temperatures and the plurality of target feeding rates, and also records the correspondence relationship as well as the printing filament that establishes the correspondence relationship in the storing element 130.

Therefore, in an embodiment, the storing element 130 records a plurality of printing filaments and the correspondence relationships between the plurality of target temperatures and the plurality of target feeding rates each corresponds to one of the recorded printing filaments. With such design, in actual operation of printing an object, different correspondence relationships can be loaded according to different printing filaments so as to set the printing parameter for printing.

Figure 3:
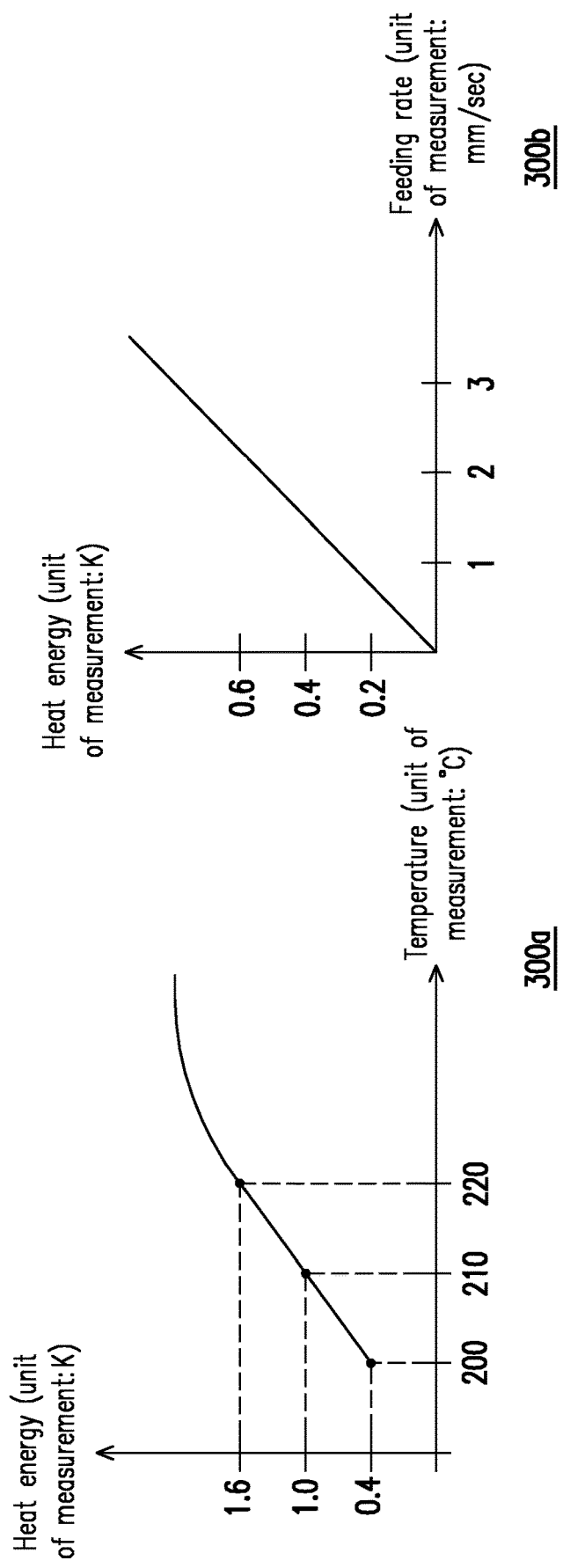
FIG. 3 is a schematic view of a 3D printing method according to an embodiment of the disclosure.

FIG. 3 is a schematic view of a 3D printing method according to an embodiment of the disclosure.

In an embodiment, the controller 150, for example, further calculates a ratio relationship of the heat energy that can be provided to the printing filament within a fixed time period at various target temperatures. Referring to FIG. 3, the target temperature of 200° C. corresponds to the target feeding rate of 2 mm/sec; the target temperature of 210° C. corresponds to the target feeding rate of 5 mm/sec; the target temperature of 220° C. corresponds to the target feeding rate of 8 mm/sec. Therefore, if the temperature of 210° C. is set as basis to assume that the heat energy which the feeder element 110 can provide to the printing filament per second at the target temperature of 210° C. is K, then the heat energy which the feeder element 110 can provide to the printing filament per second at the target temperate of 200° C. is 0.4K (i.e., "2 min/sec" is divided by "5 mm/sec", and the acquired ratio is 0.4), and the heat energy which the feeder element 110 can provide to the printing filament per second at the target temperature of 220° C. is 1.6K (i.e., "8 mm/sec" is divided by "5 mm/sec", and the acquired ratio is 1.6). For ease of understanding, the data calculated by the controller 150 is illustrated in a coordinate diagram 300a on the left side of FIG. 3.

On the other hand, if it is further assumed that the highest target feeding rate that matches the actual feeding rate is in a linear relationship with the heat energy which the feeder element 110 can provide to the printing filament per second, the relationship can be illustrated as a coordinate diagram 300b on the right side of FIG. 3. Specifically, based on the above assumption, if it is required that the target feeding rate is set to be 1 mm/sec, the feeder element 110 has to provide at least 0.2K to the printing filament so that the target feeding rate matches the actual feeding rate (e.g., the material is fed smoothly without being jammed or no occurrence of idling); if it is required that the target feeding rate is set to be 2 mm/sec, the feeder element 110 has to provide at least 0.4K to the printing filament so that the target feeding rate matches the actual feeding rate and so forth.

It should be mentioned that, with the inherent characteristics of the filament material, or due to that the heat energy that can be absorbed by filament material is limited (i.e., the filament material gets saturated absorption of heat energy), the relationship curve in the coordinate diagrams 300a and 300b may change at a relatively high temperature. For example, a tangent slope of the function in the coordinate diagram 300a is likely to decrease as the target temperature increases at a relatively high temperature, or a tangent slope of the function in the coordinate diagram 300b is likely to increase as the feeding rate increases (not shown). When the target temperature is relatively low, the function in the coordinate diagram 300a is almost a linear relationship; when the target temperature becomes higher, the function in the coordinate diagram 300a is, for example, asymptotic to a certain specific value. The above-mentioned specific value changes along with different filament materials; therefore, the disclosure provides no limitation thereto.

Accordingly, in steps S210 to S240, if more of the plurality of target temperatures and the plurality of corresponding target feeding rates are obtained, it is possible to obtain a more real and accurate correspondence relationship which corresponds to the printing filament currently in use. Similarly, if the highest target feeding rate that matches the actual feeding rate is in a non-linear relationship with the heat energy which the feeder element 110 can provide to the printing filament per second, it is possible to obtain a more real and accurate correspondence relationship that corresponds to the printing filament currently in use when more of the plurality of target temperatures and the plurality of corresponding target feeding rates are obtained in steps S210 to S240.

Referring to FIG. 2 again, after the controller 150 obtains the correspondence relationship between the plurality of target temperatures and the plurality of target feeding rates, in the process of printing object, the printing parameter can be set for printing according to the obtained correspondence relationship (S250). In an embodiment, the storing element 130 is recorded with a plurality of printing filaments and the correspondence relationship between the plurality of target temperatures and the plurality of target feeding rates each corresponds to one of the recorded printing filaments. When the 3D printing apparatus 100 is used to print an object according to a specific printing file, the controller 150, for example, loads the correspondence relationship between the plurality of target temperatures and the plurality of target feeding rates that corresponds to the printing filament currently in use from the storing element 130 in advance.

In an embodiment, in the printing operation, the controller 150 first acquires a desired feeding rate to be used at the time of printing. For example, the controller 150 reads the content of the printing file after obtaining the above-mentioned correspondence relationship to calculate the desired feeding rate to be used for printing, or for example, receives a desired feeding rate input by the user via an input interface of the 3D printing apparatus 100. Next, according to the pre-loaded correspondence relationship, a printing temperature corresponding to the desired feeding rate is calculated. In this manner, the controller 150 can set the desired feeding rate to be the target feeding rate of the printing parameter, set the printing temperature to be the target temperature of the printing parameter, and print with the printing parameter according to the content of the printing file.

For example, after pre-loading the correspondence relationship in the embodiment of FIG. 3, the controller 150 calculates the feeding rate to be used for printing as the desired feeding rate (e.g., 6.5 mm/sec) according to information in the printing file such as a bore size of the printing head or a printing rate. According to the coordinate diagram 300b on the right side of FIG. 3, it may be inferred from the linear relationship that, at the feeding rate of 6.5 mm/sec, the feeder element 110 has to provide at least 1.3K to the printing filament per second. Furthermore, according to the coordinate diagram 300a on the left side and an interpolation method can be used to infer that the printing temperature at the time of printing has to be set as 215° C. at least so that the feeder element 110 can provide 1.3K per second. Therefore, the controller 150 sets the target feeding rate of the printing parameter to be 6.5 mm/sec, and sets the target temperature to be 215° C. to perform printing according to the content of the printing file.

In another embodiment, at the time of printing, the controller 150 obtains the desired temperature to be used for printing first. For example, the controller 150 reads the content of the printing file after obtaining the correspondence relationship to calculate the desired temperature to be used for printing, or for example, receives the desired temperature input by the user via the input surface of the 3D printing apparatus 100. Next, according to the pre-loaded correspondence relationship, a printing feeding rate corresponding to the desired temperature is calculated. In this manner, the controller 150 can set the desired temperature to be the target temperature of the printing parameter, set the printing feeding rate to be the target feeding rate of the printing parameter, and print with the printing parameter according to the content of the printing file.

For example, after pre-loading the correspondence relationship in the embodiment of FIG. 3, the controller 150 calculates the printing temperature to be used for printing as the desired printing temperature (e.g., 205° C.) according to information in the printing file such as a printing temperature or a printing rate. According to the coordinate diagram 300a on the left side of FIG. 3, it may be inferred that, at the printing temperature of 205° C., the feeder element 110 can provide 0.7K of heat energy to the printing filament per second. Furthermore, according to the coordinate diagram 300b on the right side and the linear relationship can be used to infer that the feeding rate at the time of printing may be set up to 3.5 mm/sec. Therefore, the controller 150 sets the target feeding rate of the printing parameter to be 3.5 mm/sec, and sets the target temperature to be 205° C. to perform printing according to the content of the printing file.

In summary, in the 3D printing method and the 3D printing apparatus using the same provided by the embodiment of the disclosure, the material can be fed first for test before actual printing so as to obtain the correspondence relationship between the target temperatures and the target feeding rates required for the printing filament currently in use to feed smoothly in the current environment, and then the obtained correspondence relationship can be used for actual printing. With such design, no matter what filament material is used for printing object, a good printing quality can be obtained.

Finally, it should be indicated that the above-mentioned exemplary embodiments are provided only to exemplify the technical solution of the disclosure rather than to be restrictive to the disclosure. Although the disclosure has been disclosed by the above embodiments, the embodiments are not intended to limit the disclosure. It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A three-dimensional (3D) printing method for a 3D printing apparatus, comprising:
feeding a material with a printing parameter, wherein the printing parameter comprises a target temperature and a target feeding rate;
adjusting the printing parameter to change a heat energy provided to a printing filament per unit length;
determining whether the target feeding rate matches an actual feeding rate according to the adjusted printing parameter to obtain a determination result of the highest target feeding rate corresponding to a specific target temperature or the lowest target temperature corresponding to a specific target feeding rate;
obtaining a correspondence relationship between a plurality of the target temperatures and a plurality of the target feeding rates according to the adjusted printing parameters and the determination results; and
setting the printing parameter for printing according to the correspondence relationship,
wherein the highest target feeding rate corresponding to a specific target temperature is obtained by increasing the target feeding rate until the target feeding rate does not match the actual feeding rate, and the lowest target temperature corresponding to a specific target feeding rate is obtained by decreasing the target temperature until the target feeding rate does not match the actual feeding rate.

2. The 3D printing method as claimed in claim 1, wherein adjusting the printing parameter to change the heat energy provided to the printing filament per unit length comprises:
fixing the target temperature and changing the target feeding rate.

3. The 3D printing method as claimed in claim 2, wherein adjusting the printing parameter to change the heat energy provided to the printing filament per unit length comprises:
fixing the target temperature as a first target temperature, and changing the target feeding rate to find the highest target feeding rate corresponding to the first target temperature; and
fixing the target temperature as a second target temperature, and changing the target feeding rate to find the highest target feeding rate corresponding to the second target temperature.

4. The 3D printing method as claimed in claim 3, wherein obtaining the correspondence relationship between the plurality of target temperatures and the plurality of target feeding rates according to the adjusted printing parameters and the determination results comprises:
when the target temperature is fixed as the first target temperature, obtaining a first target feeding rate which is the highest target feeding rate that matches the actual feeding rate;
taking the first target feeding rate as the target feeding rate corresponding to the first target temperature;
when the target temperature is fixed as the second target temperature, obtaining a second target feeding rate which is the highest target feeding rate that matches the actual feeding rate; and
taking the second target feeding rate as the target feeding rate corresponding to the second target temperature.

5. The 3D printing method as claimed in claim 1, wherein adjusting the printing parameter to change the heat energy provided to the printing filament per unit length comprises:
fixing the target feeding rate and changing the target temperature.

6. The 3D printing method as claimed in claim 5, wherein adjusting the printing parameter to change the heat energy provided to the printing filament per unit length comprises:
fixing the target feeding rate as a first target feeding rate and changing the target temperature to find the lowest target temperature corresponding to the first target feeding rate; and
fixing the target feeding rate as a second target feeding rate and changing the target temperature to find the lowest target temperature corresponding to the second target feeding rate.

7. The 3D printing method as claimed in claim 1, wherein obtaining the correspondence relationship between the plurality of target temperatures and the plurality of target feeding rates according to the adjusted printing parameters and the determination results comprises:
when the target feeding rate is fixed as the first target feeding rate, obtaining a first target temperature, which is the lowest target temperature where the first target feeding rate matches the actual feeding rate;
taking the first target temperature as the target temperature corresponding to the first target feeding rate;
when the target feeding rate is fixed as the second target feeding rate, obtaining a second target temperature, which is the lowest target temperature where the second target feeding rate matches the actual feeding rate; and
taking the second target temperature as the target temperature corresponding to the second target feeding rate.

8. The 3D printing method as claimed in claim 1, wherein setting the printing parameter for printing according to the correspondence relationship comprises:
acquiring a desired feeding rate for printing;
calculating a printing temperature corresponding to the desired feeding rate according to the correspondence relationship;
using the desired feeding rate as the target feeding rate, and using the printing temperature as the target temperature to set the printing parameter; and
printing according to the set printing parameter.

9. The 3D printing method as claimed in claim 1, wherein setting the printing parameter for printing according to the correspondence relationship comprises:
acquiring a desired temperature for printing;
calculating a printing feeding rate corresponding to the desired temperature according to the correspondence relationship;
using the printing feeding rate as the target feeding rate, and using the desired temperature as the target temperature to set the printing parameter; and
printing according to the set printing parameter.

10. The 3D printing method as claimed in claim 1, wherein the step of determining whether the target feeding rate matches the actual feeding rate comprises:
determining whether a set target feeding rate matches the actual feeding rate of transporting the printing filament to a printing head for feeding material by a feeder element.

11. The 3D printing method as claimed in claim 1, wherein the correspondence relationship is obtained according to a linear relationship between the highest target feeding rate which matches the actual feeding rate and the heat energy which is provided to the printing filament per second.

12. A 3D printing apparatus, comprising:
a feeder element, providing a heat energy to a printing filament and feeding a material; and
a controller, coupled to the feeder element, configured to set a printing parameter to control the feeder element to feed the material according to the printing parameter, wherein the printing parameter comprises a target temperature and a target feeding rate,
wherein the controller adjusts the printing parameter to change the heat energy provided to the printing filament per unit length by the feeder element, and determines whether the target feeding rate matches an actual feeding rate of the feeder element according to the adjusted printing parameter to obtain a determination result of the highest target feeding rate corresponding to a specific target temperature or the lowest target temperature corresponding to a specific target feeding rate,
wherein the controller further obtains a correspondence relationship between a plurality of the target temperatures and a plurality of the target feeding rates according to the adjusted printing parameters and the determination results, and sets the printing parameter to print according to the correspondence relationship,
wherein the highest target feeding rate corresponding to a specific target temperature is obtained by increasing the target feeding rate until the target feeding rate does not match the actual feeding rate, and the lowest target temperature corresponding to a specific target feeding rate is obtained by decreasing the target temperature until the target feeding rate does not match the actual feeding rate.

13. The 3D printing apparatus as claimed in claim 12, wherein, when the printing parameter is adjusted to change the heat energy provided to the printing filament per unit length by the feeder element, the controller fixes the target temperature and changes the target feeding rate.

14. The 3D printing apparatus as claimed in claim 13, wherein, when the controller fixes the target temperature and changes the target feeding rate, comprising fixing the target temperature as a first target temperature and changing the target feeding rate to find the highest target feeding rate corresponding to the first target temperature, and fixing the target temperature as a second target temperature and changing the target feeding rate to find the highest target feeding rate corresponding to the second target temperature.

15. The 3D printing apparatus as claimed in claim 14, wherein, when the target temperatures is fixed as the first target temperature, the controller obtains a first target feeding rate which is the highest target feeding rate that matches the actual feeding rate, and takes the first target feeding rate as the target feeding rate corresponding to the first target temperature, wherein, when the target temperature is set as the second target temperature, the controller further obtains a second target feeding rate which is the highest target feeding rate that matches the actual feeding rate, and takes the second target feeding rate as the target feeding rate corresponding to the second target temperature.

16. The 3D printing apparatus as claimed in claim 12, wherein, when the printing parameter is adjusted to change the heat energy provided to the printing filament per unit length by the feeder element, the controller fixes the target feeding rate and changes the target temperature.

17. The 3D printing apparatus as claimed in claim 16, wherein, when the controller fixes the target feeding rate and changes the target temperature, comprising fixing the target feeding rate as a first target feeding rate and changing the target temperature to find the lowest target temperature corresponding to the first target feeding rate, and fixing the target feeding rate as a second target feeding rate and changing the target temperature to find the lowest target temperature corresponding to the second target feeding rate.

18. The 3D printing apparatus as claimed in claim 17, wherein, when the target feeding rate is fixed as the first target feeding rate, the controller obtains a first target temperature, which is the lowest target temperature where the first target feeding rate matches an actual feeding rate, and takes the first target temperature as the target temperature corresponding to the first target feeding rate, wherein, when the target feeding rate is fixed as the second target feeding rate, the controller further obtains a second target temperature, which is the lowest target temperature where the second target feeding rate matches the actual feeding rate, and takes the second target temperature as the target temperature corresponding to the second target feeding rate.

19. The printing apparatus as claimed in claim 12, wherein the controller acquires a desired feeding rate for printing and calculates a print temperature corresponding to the desired feeding rate according to the correspondence relationship, wherein the controller uses the desired feeding rate as the target feeding rate, uses the printing temperature as the target temperature to set the printing parameter, and prints according to the set printing parameter.

20. The 3D printing apparatus as claimed in claim 12, wherein the controller acquires a desired temperature for printing and calculates a printing feeding rate corresponding to the desired temperature according to the correspondence relationship, wherein the controller uses the printing feeding rate as the target feeding rate, uses the desired temperature as the target temperature to set the printing parameter, and prints according to the set printing parameter.

21. The 3D printing apparatus as claimed in claim 12, further comprising:

a sensor, coupled to a feeder element and the controller, and configured to generate a sensing signal, such that the controller determines whether the target feeding rate matches the actual feeding rate of the feeder element according to the sensing signal.

22. The 3D printing apparatus as claimed in claim 12, further comprising:

a storing element, coupled to the controller, wherein the controller further records the printing filament and the correspondence relationship between the plurality of target temperatures and the plurality of target feeding rates in the storing element.

23. The 3D printing apparatus as claimed in claim 12, wherein the operation of determining whether the target feeding rate matches the actual feeding rate comprises:

determining whether a set target feeding rate matches the actual feeding rate of transporting the printing filament to a printing head for feeding material by the feeder element.

24. The 3D printing apparatus as claimed in claim 12, wherein the correspondence relationship is obtained according to a linear relationship between the highest target feeding rate which matches the actual feeding rate and the heat energy which is provided to the printing filament per second.

* * * * *